(12) United States Patent
Zhang et al.

(10) Patent No.: US 7,830,928 B2
(45) Date of Patent: Nov. 9, 2010

(54) QUASI-PHASE MATCHING AND QUANTUM CONTROL OF HIGH HARMONIC GENERATION IN WAVEGUIDES USING COUNTERPROPAGATING BEAMS

(75) Inventors: Xiaoshi Zhang, Superior, CO (US); Amy L. Lytle, Boulder, CO (US); Oren Cohen, Boulder, CO (US); Henry C. Kapteyn, Boulder, CO (US); Margaret M. Murnane, Boulder, CO (US)

(73) Assignee: Regents of the University of Colorado, a body corp, Denver, CO (US)

(*) Notice: Subject to any disclaimer, the term of this patent is extended or adjusted under 35 U.S.C. 154(b) by 146 days.

(21) Appl. No.: 11/888,916

(22) Filed: Aug. 2, 2007

(65) Prior Publication Data
US 2008/0137696 A1    Jun. 12, 2008

Related U.S. Application Data

(60) Provisional application No. 60/835,138, filed on Aug. 2, 2006.

(51) Int. Cl.
*H01S 3/10* (2006.01)
(52) U.S. Cl. .................. 372/22; 372/5; 372/29.023; 372/29.016
(58) Field of Classification Search .................. 372/22, 372/5, 29.023, 29.016
See application file for complete search history.

(56) References Cited

U.S. PATENT DOCUMENTS

2004/0000942 A1* 1/2004 Kapteyn et al. ............. 327/306
2005/0147147 A1* 7/2005 Umstadter et al. ............ 372/73

OTHER PUBLICATIONS

Durfee et al., "Phase Matching of High-Order Harmonics in Hollow Waveguides", Sep. 13, 1999, The American Physical Society, Physical Review Letters, vol. 83, No. 11, 2187-2190.*
Peatross et al., "Selective zoning of high harmonic emission using counter-propagating light", Aug. 27, 1997, OSA, Optics Express, vol. 1, No. 5, 114-125.*
Weiner et al., "High-Resolution femtosecond pulse shaping", Aug. 1988, OSA, J. Opt. Soc. Am. B, vol. 5, No. 8, 1563-1572.*
Shkolnikov, A. et al., Optimal Quasi-Phase-Matching for High-Order Harmonic Generation in Gases and Plasmas, Physical Review A, Dec. 1994, pp. R4461-R4464, vol. 50, No. 6.

(Continued)

*Primary Examiner*—Minsun Harvey
*Assistant Examiner*—Joshua King
(74) *Attorney, Agent, or Firm*—Jennifer L. Bales; Macheledt Bales LLP

(57) ABSTRACT

All-optical quasi-phase matching (QPM) uses a train of counterpropagating pulses to enhance high-order harmonic generation (HHG) in a hollow waveguide. A pump pulse enters one end of the waveguide, and causes HHG in the waveguide. The counterpropagation pulses enter the other end of the waveguide and interact with the pump pulses to cause QPM within the waveguide, enhancing the HHG.

27 Claims, 2 Drawing Sheets

OTHER PUBLICATIONS

Milchberg, H. M. et al., High-Order Frequency Conversion in the Plasma Waveguide, Physical Review Letters, Sep. 1995, pp. 2494-2497, vol. 75, No. 13.

Rundquist, A. et al., Phase-Matched Generation of Coherent Soft X-Rays, Science, May 1998, pp. 1412-1415, vol. 280.

Durfee III, C. G. et al., Phase Matching of High-Order Harmonics in Hollow Waveguides, Physical Review Letters, Sep. 1999, pp. 2187-2190, vol. 83, No. 11.

Peatross, J. et al., Intensity-Dependent Phase-Matching Effects in Harmonic Generation, Journal of Optical Society of America B, May 1995, pp. 863-870, vol. 12, No. 5.

Peatross, J. et al., Selective Zoning of High Harmonic Emission Using Counter-Propagating Light, Optics Express, Sep. 1997, pp. 114-125, vol. 1, No. 5.

Voronov, S. L. et al, Control of Laser High-Harmonic Generation with Counterpropagating Light, Physical Review Letters, Sep. 2001, pp. 133902-1-133902-4, vol. 87, No. 13.

Christov, Ivan P., Enhanced Generation of Attosecond Pulses in Dispersion-Controlled Hollow-Core Fiber, Physical Review A, Oct. 1999, pp. 3244-3250, vol. 60, No. 4.

Christov, I. P. et al., Quasi-Phase Matching of High-Harmonics and Attosecond Pulses in Modulated Waveguides, Optics Express, Nov. 2000, pp. 362-367, vol. 7, No. 11.

Gibson, E. A. et al., Coherent Soft X-Ray Generation in the Water Window with Quasi-Phase Matching, Science, Oct. 2003, pp. 95-98, vol. 302.

"High harmonic generation in a semi-infinite gas cell;" J. R. Sutherland et al.; Optics Express vol. 12, No. 19, Sep. 20, 2004, pp. 4430-4436.

Paul et al., Quasi-phase matched gerneation of coherent extreme ultrviolet light, Nature, Jan. 2003, vol. 421, pp. 51-54.

Gibson et al., Coherent Soft X-ray Generation in the Water Window with Quasi-Phase Matching, Science, Oct. 3, 2003, vol. 302, pp. 95-98.

* cited by examiner

QUASI-PHASE MATCHING AND QUANTUM CONTROL OF HIGH HARMONIC GENERATION IN WAVEGUIDES USING COUNTERPROPAGATING BEAMS

PRIORITY

This application claims benefit of U.S. Provisional Patent Application No. 60/835,138, filed Aug. 2, 2006 and incorporates it therein by reference.

GOVERNMENT SUPPORT

The present invention was made with government support as follows, and the U.S. Government has certain rights in the invention.

National Science Foundation Cooperative Agreement No. EEC-0310717, "NSF Engineering Research Center in Extreme Ultraviolet Science and Technology."

Department of Energy, National Nuclear Security Administration, Grant No. DE-FG52-06NA26151, "Investigations of Laser Materials Interactions using Ultrafast Short-Wavelength Light."

BACKGROUND OF THE INVENTION

1. Field of the Invention

The present invention relates to high harmonic generation (HHG) using quasi-phase matching (QPM) via counterpropagating pulse trains in waveguides.

2. Description of the Prior Art

High-order harmonic generation (HHG) driven by ultrashort laser pulses is a source of extreme-ultraviolet and soft X-ray light with the unique properties of ultrashort pulse duration and high spatial and temporal coherence. This source has made possible new ultrafast spectroscopic probes of atoms, molecules and materials. So far, however, most applications have used relatively long wavelengths, because the conversion rapidly decreases at shorter wavelengths. This decrease is not due primarily to the very high-order nonlinearity of the process—in fact, the atomic physics of HHG is non-perturbative, and has favorable scaling to shorter wavelengths. The major challenge is that, unlike low-order nonlinear processes such as second-harmonic generation, HHG is inherently associated with ionization of the nonlinear medium. In HHG, an electron is first ionized by the field of an intense femtosecond laser. Once free, the electron begins to oscillate in response to the laser field. A small fraction of the ionized electron can re-collide with its parent ion, recombining and liberating the excess energy as a short-wavelength photon.

As in all nonlinear parametric processes in nature, efficient conversion of light from one frequency to another using nonlinear optics requires that the process be phase-matched. As the pump beam propagates, the nonlinear response of the medium coherently adds to the harmonic signal. The generated field continues to add constructively if the two waves travel with the same phase velocity through the medium, leading to a bright, phase-matched beam at the new wavelength. If the process is not phase-matched, coherent build-up is limited to a propagation distance over which the relative phase of the fundamental and the harmonic light slip by 180°. This distance is the coherence length $L_c = \pi/\Delta k$, where $\Delta k$ is the phase mismatch between the polarization wave and the harmonic wave. For HHG, dispersion of the free-electron plasma reduces $L_c$ to tens of micrometers for up-conversion to very short wavelengths, which are only generated when the laser is very intense and thus the medium is already highly ionized. As a result, efficient harmonic generation is possible only at relatively low levels of ionization, below a 'critical' ionization level of around 5% for Argon or around 0.5% for helium, corresponding to photon energies of around 50 eV and around 130 eV respectively.

Thus, new methods that can correct for this phase mismatch in ionized media (plasmas) are a 'grand challenge' in this area of laser science.

In the absence of phase-matching, quasi-phase matching (QPM) techniques have been successfully demonstrated to compensate for this phase slip by periodically readjusting the relative phase of the fundamental and nonlinear response at an interval corresponding to the coherence length. In the visible region, this is achieved by periodically reversing the polarization of a non-centrosymmetric nonlinear-optical material. However, this implementation cannot be used for HHG, because HHG uses a low-pressure gas as the nonlinear medium.

Past experimental work used a periodically modulated hollow waveguide to modulate the intensity of the driving laser to implement QPM for high-harmonic generation. U.S. Pat. No. 6,151,155, incorporated herein by reference, is a useful background reference. Even a small modulation (around 1%) of the driving laser results in significant modulation in both the amplitude and phase of the harmonics. Although this past work succeeded in enhancing conversion efficiency into the soft X-ray region of the spectrum by about one order of magnitude, further optimization will require a more sophisticated approach. This is because optical loss of the driving laser, refraction, mode beating and group-velocity dispersion all result in a continuous variation of the coherence length along the direction of propagation, making it difficult to optimize the modulation period. Finally, modulation periods shorter than the waveguide diameter will not significantly influence the laser field, making it challenging to compensate for very short coherence lengths.

Recently, Voronov et al. demonstrated that a weak counterpropagating pulse can be used to disrupt high-harmonic emission, with the objective of using this technique to implement QPM. This experiment used a simple focused-beam geometry in a low-pressure gas. The counterpropagating field induced both a standing amplitude and phase modulation on the driving laser field. Even though the counterpropagating field was weak, it distorted the field of the driving laser, essentially turning off phase-coherent high-harmonic production in the region where the two pulses overlapped. That work also demonstrated that if the HHG signal is deliberately suppressed by a non-optimum focusing geometry, a single counterpropagating pulse can recover much of the original harmonic signal that had previously been obtained in the optimum-focus geometry. However, this work only investigated harmonic emission in regimes where conventional phase-matching was already possible in the medium. Attempts to obtain enhancements significantly greater than what could otherwise be obtained were not successful.

A need remains in the art for a method of using a train of counterpropagating light pulses to enhance high-harmonic emission in a waveguide.

SUMMARY OF THE INVENTION

An object of the present invention is to use a train of counterpropagating light pulses to enhance high-harmonic emission in a waveguide. This all-optical quasi-phase-matching technique uses interfering beams to scramble the quantum phase of the generated short-wavelength light, to suppress emission from out-of-phase regions.

The method of generating coherent x-ray emissions comprises the steps of: providing a hollow waveguide filled with a gas, for example a noble gas such as argon, focusing a femtosecond pump pulse into one end of the waveguide to cause high-harmonic generation (HHG), for example in the X-ray region of the spectrum, within the gas, focusing a counterpropagating pulse train into the other end of the waveguide so that the counterpropagating pulse train modulates the quantum phase of the HHG signal, and adjusting the timing and duration of the pulses of the counterpropagating pulse train to achieve quasi-phase matching (QPM) within the gas by interrupting the HHG process in areas where the HHG process is undergoing destructive interference.

It is also useful to adjust the coherence length of the HHG by adjusting the pressure of the noble gas. The noble gas may be argon at about 5-10 torr pressure.

The pump pulse may be produced by compressing a portion of a pulse from a laser, and the counterpropagating pulse train may be generated by spatially spreading the spectrum of another portion of the pulse from the laser, delaying different portions of the spectrum by different amounts to generate a pulse train, and compressing the pulse train.

The laser pulse may be generated by a Ti:sapphire laser and amplifier. The laser pulse could be about 5 milliJoules, about 100 picoseconds duration, about a 1 kHz repetition rate, and chirped.

The step of producing the pump pulse may be accomplished with a grating pair compressor, while the step of delaying could be performed by passing different portions of the spectrum through differing thicknesses of optical material. The step of spatially spreading the spectrum and the step of compressing may also be performed by a grating pair.

The pump pulse comprises a pulse of approximately 25 femtoseconds and the counterpropagating pulse train comprises pulses of about 1-2 picoseconds. The waveguide is a hollow waveguide several centimeters long and about 150 µm in diameter.

DETAILED DESCRIPTION OF THE PREFERRED EMBODIMENT

Figure 1:
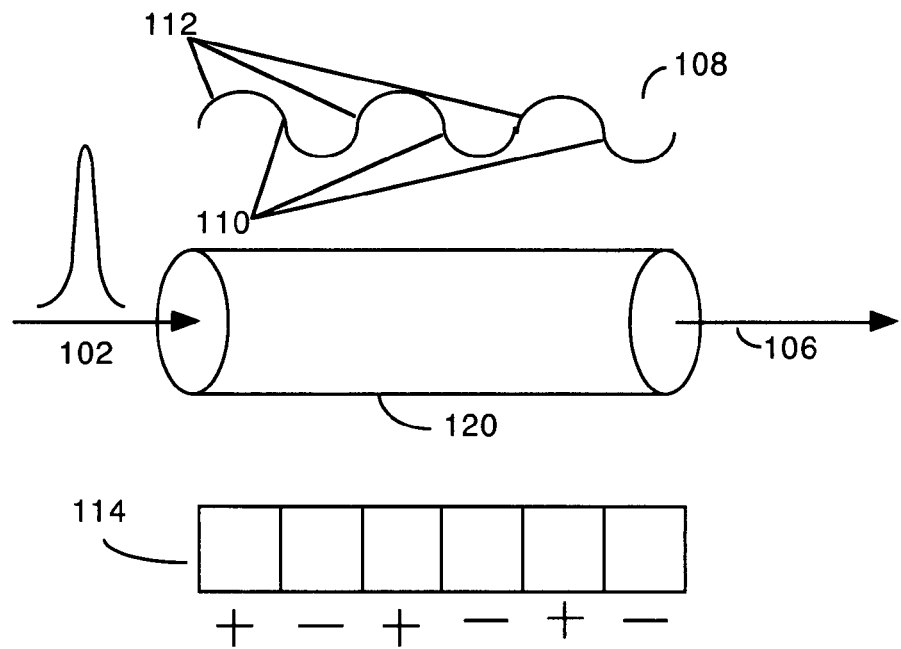
FIG. 1 (Prior Art) is a schematic diagram illustrating high-harmonic emission generation (HHG) in a waveguide without quasi-phase matching.

FIG. 1 (Prior Art) is a schematic diagram illustrating high-harmonic emission generation (HHG) in a waveguide where the process is not phase-matched, and without quasi-phase matching. Input pulse 102 comprises a femtosecond laser pulse, which enters hollow waveguide 120. Signal waveform 108 gives a general indication of the amplitude of HHG over the path length of pulse 102 through waveguide 120. Diagram 114 indicates the regions within waveguide 120 in which constructive and destructive interference of HHG emissions will occur, due to the short coherence length of the HHG beam. The areas indicated by a plus (+) are areas of constructive interference, while the areas indicated by a minus (−) are areas of destructive interference. The length of the plus and minus areas is exactly one coherence length.

Hence, at first the HHG amplitude increases, but as the coherence length is reached destructive interference causes the amplitude to decrease. This process is repeated with a period of two coherence lengths, with the portions 112 of the waveform 108 wherein the HHG beam is being amplified being followed by portions where it is attenuated. Hence, output beam 106 will contain little HHG signal. The largest HHG signal would be obtained if the waveguide length corresponded to an odd number multiple of coherence lengths.

Figure 2:
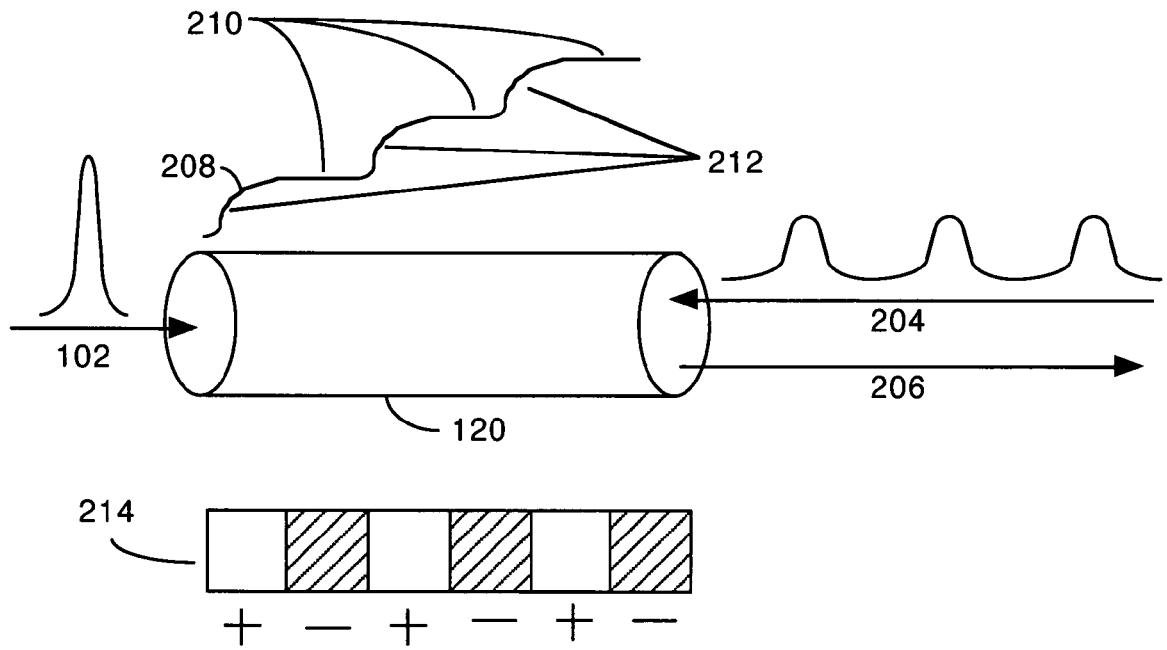
FIG. 2 is a schematic diagram illustrating the use of counterpropagating light pulses to enhance HHG via quasi-phase matching (QPM) in a waveguide according to the present invention.

FIG. 2 is a schematic diagram illustrating the use of counterpropagating light pulses 204 to enhance HHG via quasi-phase matching (QPM) in a waveguide 120. In one embodiment, a 25 fs pump pulse 102 generates the harmonics, and between one and three (or more) consecutive counterpropagating 6 ps probe pulses 204 induce the quasi-phase matching. The beams are coupled into hollow waveguide 120 from opposite directions. The presence of the waveguide creates a near plane-wave propagation of the driving pulse, and also confines the gas medium for HHG at a near-constant pressure. The guiding also helps to counteract plasma-induced defocusing of the laser, and to generate an output beam with full spatial coherence. This results in an extended propagation length over which the coherence length $L_c$ varies modestly. The waveguide also constrains the direction of propagation of both the driving laser, and the counterpropagating pulses. These advantages facilitate the successful implementation of this QPM scheme, in contrast to prior art, which did not observe significant enhancement of signal using a counterpropagating pulse train in a free-space geometry.

The object of counterpropagating pulse is to modulate forward-propagating/driving field in both amplitude and phase along the direction of propagation, z, with a periodicity corresponding to half the driving laser wavelength. As a result, the phase of the local extreme-ultraviolet emission also exhibits oscillations along z with the same periodicity. These rapid phase variations prevent the coherent build-up of the harmonic field, suppressing the efficiency in the regions where the pulses intersect. These suppressed-efficiency regions are approximately aligned with the areas within waveguide 120 in which destructive interference of the HHG would otherwise occur (out-of-phase zones). In practice, this is accomplished experimentally: the modulation of the harmonic signal is observed as the intersection point between the two beams in the waveguide is varied. Optimal suppression of the emission from out-of-phase zones is accomplished when the effective counterpropagating pulse width and pulse separation correspond to one and two coherence lengths, respectively.

The superposition of the forward-traveling pulse 102 and weak counterpropagating beams 204 can be described by alternating regions where the harmonic polarization generated by the driving beam alone would be out of phase with the existing harmonic signal but the generation of new harmonic signal is suppressed by the counterpropagating beam, and where the harmonic polarization generated by the driving beam is in phase with the existing harmonic signal and the harmonic signal builds-up. Moreover, maximum enhancement and suppression will be obtained when the length of the intersection region (half the counterpropagating pulse length, as the pulses move in opposite directions) equals the coherence length. For QPM using a pulse sequence, the pulse separation must therefore equal $4L_c$ for maximum enhancement, as the effective pulse separation in the frame co-moving with the forward propagating pulse will then be $2L_c$.

Turning to FIG. 2, diagram 214 indicates the regions within waveguide 120 in which constructive and destructive interference of HHG emissions will occur, due to the short coherence length of the HHG beam. The areas of destructive interference are shaded to indicate that the harmonic polarization is out of phase with existing harmonic signal, but the harmonic signal is suppressed (note that in practice, the areas of destructive interference may not be adjacent. Therefore, signal waveform 208, which gives a general indication of the amplitude of HHG over the path length of pulse 102 through waveguide 120 now indicates areas 212 of HHG amplification interspersed with areas 210 where HHG neither amplifies nor attenuates. Thus, the amplitude of HHG field in output beam 206 is amplified 3 times (208), which corresponds to 9 times amplification of HHG intensity.

Figure 3:
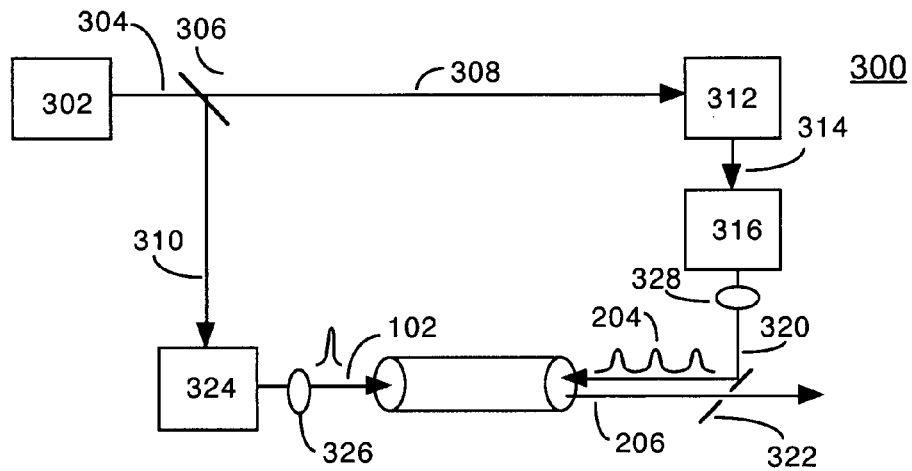
FIG. 3 is a block diagram showing a preferred embodiment of apparatus for generating HHG via QPM according to the present invention.

FIG. 3 is a block diagram showing one preferred embodiment 300 of apparatus for generating HHG via QPM as shown in FIG. 2. In this setup, QPM HHG is accomplished in a several-cm long, 150 μm diameter hollow waveguide 120 combining two beams—the first a 25 fs pump pulse 102 to generate harmonics, and the second a pulse train 204 comprising between one and three consecutive counterpropagating 1.6 ps probe pulses. Several experimental setups have been tested. In one example, a 2.5 cm waveguide 120 filled with argon at about 5 torr was used. Pulse train 204 consisted of two pulses of length 0.48 mm with an effective pulse separation of 1.1 mm, each having a pulse energy of 0.1 mJ. Pump pulse 102 had a pulse energy of 0.42 mJ. A maximum enhancement factor of 300 was observed, in the output of the $43^{rd}$ harmonic.

In another example, pulse train 204 consisted of three pulses of length 0.34 mm separated by 1.1 mm, each having a pulse energy of 0.12 mJ. Pump pulse 102 had a pulse energy of 0.46 mJ. The length of waveguide 120 was 6 cm in this case. A maximum enhancement factor of 300 was observed, in the output of the $41^{st}$ harmonic.

Combined mode locked Ti:sapphire laser and ti:sapphire laser amplifier employing chirped pulse amplification 302 generates 4.8 mJ chirped pulses of ~100 ps duration at 1 kHz repetition rate, 304. Beam splitter divides beam 304 into two parts; a pump beam 310 having about 30% of the power of beam 304, and a beam 308 for generating the counterpropagating pulses.

The pump beam 310 pulse is compressed to around 25 fs using a grating pair compressor 324. It is then coupled into several-cm long, 150 μm diameter hollow waveguide 120 using a 75 cm focal length lens 326, resulting in input pulses 102.

Figure 4:
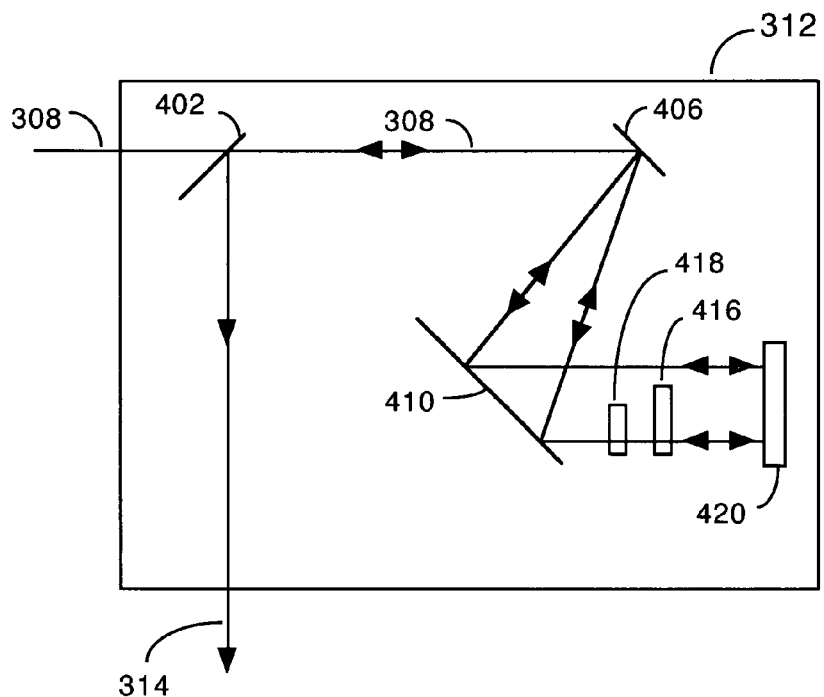
FIG. 4 is a block diagram illustrating the generation of the counterpropagating pulse train in FIG. 3.

Beam 308 enters combination compressor/pulse shaper 312, shown in more detail in FIG. 4. Block 312 compresses beam 308 pulses to a picosecond duration and divides them into a sequence of pulses transmitted to motorized delay-line block 316, used to adjust the timing of pulses 314 (for example by changing the path length slightly). 75 cm focal length lens 328 then transmits the counterpropagating pulses to mirror 322, which reflects them into the other end of waveguide 120 as counterpropagating pulse train 204.

Pump pulses 102 and counterpropagation pulses 204 interact within waveguide 120 as shown in FIG. 2 to generate QPM and enhance HHG. Output beam 206, which passes through a hole in mirror 322, thus contains a substantial amount of HHG emission. The remaining laser light at the fundamental wavelength can be rejected by, for example two aluminum foil filters (not shown) of 200 nm thickness each.

FIG. 4 is a block diagram illustrating a preferred device for the generation of the counterpropagating pulse train in FIG. 3. Combination compressor/pulse shaper 312 includes a mirror 402, which beam 308 does not reflect from, but simply passes over. Beam 308 enters the compressor portion of block 312 and grating pair 406, 410 spatially spreads the spectrum of the pulses. Pulse shaping portion of block 312 comprises two pieces of glass 416, 418 which delay three portions of the compressed beam by differing amounts by means of the index of refraction of the glass. Thus, beam 314 consists of a pulse train wherein the pulses are different portions of the spectrum. The pulse separation can be individually varied by varying the thickness of 416 and 418. Roof mirror 420 then displaces the beam in the vertical direction, and retroreflects the light so that it again passes through 416 and 418, and reflects from 410 and 406, finally reflecting from mirror 402 and resulting in output beam 314. The individual pulses emerging from 312 are also compressed from the initial ~100 ps duration to ~1 ps duration due to dispersion of the grating pair, which induces a variation in optical path length as a function of frequency of the laser light. The separation of the gratings can be used to vary the ~1 ps duration of the individual pulses.

While the exemplary preferred embodiments of the present invention are described herein with particularity, those skilled in the art will appreciate various changes, additions, and applications other than those specifically mentioned, which are within the spirit of this invention. For example, in compressor/pulse shaper 312, the glass plates 416 and 418 induce a phase delay for light in specific portions of the frequency spectrum of the input pulse. This phase delay could equivalently be controlled using a spatial light modulator that can be electrically controlled, allowing for adjustment and optimization of the separation of the pulses in the counterpropagating train, as well as the duration of each pulse individually. Other types of ultrashort pulse shapers, based on liquid crystal light modulators, transverse or longitudinal acousto-optic modulators, deformable mirrors, or interferometers can also be used to generate a pulse train. Other variations would be on the type of waveguide used—for example, the use of metal or dielectric waveguides, or a plasma waveguide created by either an electric discharge or another laser, or a waveguide created by the driving pulse itself through self focusing. This counterpropagating pulse technique could also be combined with other methods for phase matching or quasi-phase-matching of high-order harmonic generation, such as by using modulated waveguides, by tapering the waveguide, or by using multisection waveguides with varying conditions in each section. Furthermore, the laser pulse driving the harmonic generation could be composed of different colors, or either the driving pulse, and/or the counterpropagating pulse, could have a spectrum corresponding to a "two-color" or multicolor pulse.

What is claimed is:

1. The method of generating coherent x-ray emissions within a desired spectral region comprising the steps of:
   (a) providing a hollow waveguide filled with a gas, the waveguide having a first end and a second end;
   (b) focusing a forward-going femtosecond pump pulse into one end of the waveguide to cause high-harmonic generation (HHG) upconversion of the light to shorter wavelengths within the gas;
   (c) focusing a counterpropagating pulse train into the other end of the waveguide; wherein the counterpropagating pulse train modulates the optical phase of the HHG signal within the waveguide; and (d) adjusting the timing and duration of the pulses of the counterpropagating pulse train to achieve effective quasi-phase matching (QPM) within the gas by interrupting the HHG process in areas where the HHG signal buildup is undergoing destructive interference, wherein effective QPM is defined as increased conversion into the desired spectral region compared to the maximum attained where the same total energy is in an optimized forward-going pulse.

2. The method of claim 1, further comprising the step of adjusting the coherence length of the HHG by adjusting the pressure of the gas.

3. The method of claim 1 wherein the gas is a noble gas.

4. The method of claim 3 wherein the gas is argon.

5. The method of claim 3 wherein the gas is at about 5-10 torr pressure.

6. The method of claim 1 wherein the gas is a plasma.

7. The method of claim 1 further including the step of producing the pump pulse and generating the counterpropagating pulse train from portions of a pulse from a laser.

8. The method of claim 7 wherein the laser pulse is generated by a Ti:sapphire laser and amplifier.

9. The method of claim 8 wherein the laser pulse is about 5 milliJoules, about 100 picoseconds duration, about a 1 kHz repetition rate, and chirped.

10. The method of claim 1 further including the step of producing the pump pulse by compressing a portion of a pulse from a laser.

11. The method of claim 1 further including the step of generating the counterpropagating pulse train by pulse shaping a pulse from a laser.

12. The method of claim 11, wherein the pulse shaping step comprises the step of delaying different portions of the spectrum by different amounts and recollimating the spectrum to generate a pulse train.

13. The method of claim 12, wherein the pulse shaping step further comprises the step of spatially spreading the spectrum of a pulse from the laser before delaying different portions of the spectrum by different amounts.

14. The method of claim 13 wherein the step of delaying is performed by passing different portions of the spectrum through differing thicknesses of optical material.

15. The method of claim 1 wherein the step of producing the pump pulse is accomplished with a grating pair compressor.

16. The method of claim 1 wherein the step of spatially spreading the spectrum and the step of compressing are performed by a grating pair.

17. The method of claim 1 wherein the pump pulse comprises a pulse of approximately 25 femtoseconds and the counterpropagating pulse train comprises pulses of about 1-2 picoseconds.

18. The method of claim 1 wherein the waveguide is a hollow waveguide several centimeters long and about 150 μm in diameter.

19. The method of claim 1 wherein the timing and duration of the pulses is chosen to selectively enhance the HHG signal buildup for one or a few harmonic orders.

20. The method of claim 1 wherein the QPM occurs over multiple coherence lengths within the waveguide.

21. Apparatus for generating coherent x-ray emissions within a desired spectral region comprising:
   a hollow waveguide filled with a gas;
   means for producing a forward-going femtosecond pump pulse;
   means for focusing the pump pulse into one end of the waveguide to cause high-harmonic generation (HHG), in the X-ray region of the spectrum, within the gas;
   means for generating a counterpropagating pulse train;
   means for focusing the counterpropagating pulse train into the other end of the waveguide; wherein the counterpropagating pulse train modulates the optical phase of the HHG signal within the waveguide; and
   means for adjusting the timing and duration of the pulses of the counterpropagating pulse train to achieve effective quasi-phase matching (QPM) within the gas by interrupting the HHG process in areas where the HHG process is undergoing destructive interference, wherein effective QPM is defined as increased conversion into the desired spectral region compared to the maximum attained where the same total energy is in an optimized forward-going pulse.

22. The apparatus of claim 21 wherein the waveguide is a hollow waveguide several centimeters long and about 150 μm in diameter.

23. The apparatus of claim 21 wherein the means for producing the pump pulse comprises:
   Ti:sapphire laser;
   a Ti:sapphire amplifier; and
   a grating pair compressor.

24. The apparatus of claim 21 wherein the means for generating the counterpropagating pulse train comprises:
   an element for spatially spreading the spectrum of a femtosecond pulse;
   an element for delaying different portions of the spectrum different amounts to produce a pulse train; and
   a compressor for compressing the pulses to a few picoseconds.

25. The apparatus of claim 24 wherein the element for spatially spreading the spectrum and the element for compressing the pulses comprises a grating pair.

26. The apparatus of claim 24 wherein the element for delaying comprises optical elements of differing thickness and means for passing different portions of the spectrum through the optical elements.

27. The apparatus of claim 26 wherein the optical elements comprise blocks of glass.

* * * * *